(12) United States Patent
Wu et al.

(10) Patent No.: US 12,294,175 B2
(45) Date of Patent: May 6, 2025

(54) OPTICAL TRANSCEIVER WITH PARTITION FOR PREVENTING INTERFERENCE FIT AND OPTICAL SYSTEM HAVING THE SAME

(71) Applicant: Prime World International Holdings Ltd., New Taipei (TW)

(72) Inventors: Guang-Kai Wu, New Taipei (TW); Yi-Ju Wang, New Taipei (TW); Ming-You Lai, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 482 days.

(21) Appl. No.: 17/578,122

(22) Filed: Jan. 18, 2022

(65) Prior Publication Data

US 2023/0231338 A1 Jul. 20, 2023

(51) Int. Cl.
*H01R 13/62* (2006.01)
*G02B 6/42* (2006.01)
*H01R 13/504* (2006.01)
*H01R 13/627* (2006.01)

(52) U.S. Cl.
CPC ......... *H01R 13/504* (2013.01); *G02B 6/4246* (2013.01); *G02B 6/4277* (2013.01); *G02B 6/4284* (2013.01); *H01R 13/6275* (2013.01)

(58) Field of Classification Search
CPC ............. H01R 13/504; H01R 13/6275; G02B 6/4246; G02B 6/4277; G02B 6/4284; G02B 6/4261; G02B 6/4287; G02B 6/4256; H04B 10/40
See application file for complete search history.

(56) References Cited

U.S. PATENT DOCUMENTS

| | | | | |
|---|---|---|---|---|
| 5,967,825 A * | 10/1999 | Lima | ...................... | H01R 13/62 439/372 |
| 6,368,153 B1 * | 4/2002 | Hwang | .............. | H01R 13/6594 439/607.2 |
| 6,887,091 B1 * | 5/2005 | Wu | ..................... | H01R 13/6335 439/352 |
| 6,916,123 B2 * | 7/2005 | Kruger | ................. | G02B 6/4246 385/139 |
| 7,402,070 B1 * | 7/2008 | Wu | ..................... | H01R 13/6275 439/352 |
| 7,416,433 B1 * | 8/2008 | Wu | ....................... | G02B 6/4246 439/372 |
| 7,422,457 B1 * | 9/2008 | Wu | ....................... | G02B 6/4261 439/258 |
| 7,429,185 B1 * | 9/2008 | Wu | .................... | H01R 13/6275 439/372 |
| 7,445,485 B1 * | 11/2008 | Wu | ....................... | H01R 13/633 439/372 |

(Continued)

*Primary Examiner* — Abdullah A Riyami
*Assistant Examiner* — Nelson R. Burgos-Guntin
(74) *Attorney, Agent, or Firm* — Grossman Tucker Perreault & Pfleger, PLLC

(57) ABSTRACT

An optical system includes a cage and an optical transceiver. The optical transceiver is inserted into the cage in a pluggable manner, and includes a housing, a partition component provided on the housing, and a fastening component movably disposed on the housing. The fastening component is detachably fastened with the cage. The partition component is located between the fastening component and the cage to separate at least a part of the fastening component from the cage.

20 Claims, 8 Drawing Sheets

(56) References Cited

U.S. PATENT DOCUMENTS

| | | | | |
|---|---|---|---|---|
| 7,771,225 B1* | 8/2010 | Wu | H01R 13/65912 | 439/372 |
| 8,571,375 B1* | 10/2013 | Kyi | G02B 6/4284 | 439/372 |
| 9,118,149 B2* | 8/2015 | Kappla | H01R 13/665 | |
| 9,453,972 B1* | 9/2016 | Arvelo | G02B 6/3825 | |
| 9,853,397 B1* | 12/2017 | Bucher | H01R 13/6335 | |
| 9,929,500 B1* | 3/2018 | Ista | H01R 13/6271 | |
| 9,972,944 B1* | 5/2018 | Long | H01R 24/30 | |
| 10,104,760 B1* | 10/2018 | Briant | G02B 6/4284 | |
| 10,539,753 B1* | 1/2020 | Leigh | G02B 6/4268 | |
| 10,578,818 B1* | 3/2020 | Chen | G02B 6/4284 | |
| 10,742,323 B1* | 8/2020 | Chen | G02B 6/3893 | |
| 2003/0161108 A1* | 8/2003 | Bright | G02B 6/4277 | 361/707 |
| 2004/0132327 A1* | 7/2004 | Minota | H01R 13/62933 | 439/160 |
| 2005/0181650 A1* | 8/2005 | Chang | H01R 13/6335 | 439/157 |
| 2005/0195565 A1* | 9/2005 | Bright | H05K 7/20418 | 361/688 |
| 2009/0147493 A1* | 6/2009 | Wu | H05K 9/0016 | 361/818 |
| 2009/0156058 A1* | 6/2009 | Wu | H01R 13/6584 | 439/607.18 |
| 2009/0227133 A1* | 9/2009 | Zhang | H01R 13/6583 | 439/160 |
| 2010/0091466 A1* | 4/2010 | Wu | G06K 13/08 | 361/747 |
| 2010/0091467 A1* | 4/2010 | Wu | G02B 6/4284 | 361/728 |
| 2010/0178783 A1* | 7/2010 | Bright | H01R 12/721 | 439/79 |
| 2011/0081114 A1* | 4/2011 | Togami | H01R 13/6335 | 385/136 |
| 2011/0250791 A1* | 10/2011 | Straka | H01R 13/65914 | 29/874 |
| 2011/0279984 A1* | 11/2011 | Su | H01R 13/6582 | 361/728 |
| 2011/0304996 A1* | 12/2011 | Wu | G02B 6/4292 | 361/752 |
| 2012/0058652 A1* | 3/2012 | Wang | H01R 13/6335 | 439/76.1 |
| 2012/0063100 A1* | 3/2012 | Su | H01R 13/6658 | 361/747 |
| 2012/0214345 A1* | 8/2012 | Wu | H01R 13/6583 | 439/607.19 |
| 2012/0218720 A1* | 8/2012 | Wu | H01R 13/6275 | 361/740 |
| 2012/0220152 A1* | 8/2012 | Wu | H01R 13/6581 | 439/350 |
| 2012/0294571 A1* | 11/2012 | Kappla | H01R 13/6275 | 385/76 |
| 2013/0288507 A1* | 10/2013 | Zhu | H01R 13/62 | 439/345 |
| 2014/0126957 A1* | 5/2014 | Shi | F16B 5/125 | 403/322.1 |
| 2014/0127930 A1* | 5/2014 | Schmelz | H01R 13/62933 | 439/350 |
| 2014/0134898 A1* | 5/2014 | Wang | H01R 13/635 | 439/843 |
| 2014/0179143 A1* | 6/2014 | Kappla | H01R 13/6335 | 439/310 |
| 2014/0193993 A1* | 7/2014 | Meng | H01R 13/633 | 439/352 |
| 2015/0093083 A1* | 4/2015 | Tsai | G02B 6/4261 | 385/92 |
| 2016/0211625 A1* | 7/2016 | Sharf | G02B 6/4284 | |
| 2016/0359273 A1* | 12/2016 | Tanaka | H01R 13/6335 | |
| 2018/0252871 A1* | 9/2018 | Yeh | G02B 6/4292 | |
| 2019/0103920 A1* | 4/2019 | Lin | G02B 6/4246 | |
| 2019/0181582 A1* | 6/2019 | Beltran | G06F 1/20 | |
| 2019/0305482 A1* | 10/2019 | Shah | G02B 6/4284 | |
| 2020/0221607 A1* | 7/2020 | Bucher | H01R 12/716 | |
| 2020/0313348 A1* | 10/2020 | Liu | H01R 13/639 | |
| 2021/0075161 A1* | 3/2021 | Qiao | H01R 12/771 | |
| 2021/0103108 A1* | 4/2021 | Wall, Jr. | H04B 10/40 | |
| 2021/0296818 A1* | 9/2021 | Briant | H01R 13/6691 | |
| 2021/0389534 A1* | 12/2021 | Yu | H05K 7/20336 | |
| 2022/0091345 A1* | 3/2022 | Lin | G02B 6/4261 | |
| 2022/0200210 A1* | 6/2022 | Balakrishnan | H01R 13/659 | |
| 2023/0089633 A1* | 3/2023 | Chen | H01R 13/6335 | 439/484 |
| 2023/0231338 A1* | 7/2023 | Wu | H01R 13/6275 | 439/135 |
| 2023/0333338 A1* | 10/2023 | Lai | G02B 6/4284 | |

* cited by examiner

OPTICAL TRANSCEIVER WITH PARTITION FOR PREVENTING INTERFERENCE FIT AND OPTICAL SYSTEM HAVING THE SAME

BACKGROUND

1. Technical Field

The present disclosure relates to optical communication, more particularly to an optical system including a cage and an optical transceiver.

2. Related Art

Optical modules, such as optical transceivers, are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others such as QSFP-DD (double density) and QSFP-28 at different communication rates have been made available.

A fastening mechanism is provided for securely fixing the optical transceiver to the cage. On the other hand, the optical transceiver must include a releasing mechanism so that the optical transceiver could be released from the cage smoothly when necessary.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

Figure 1:
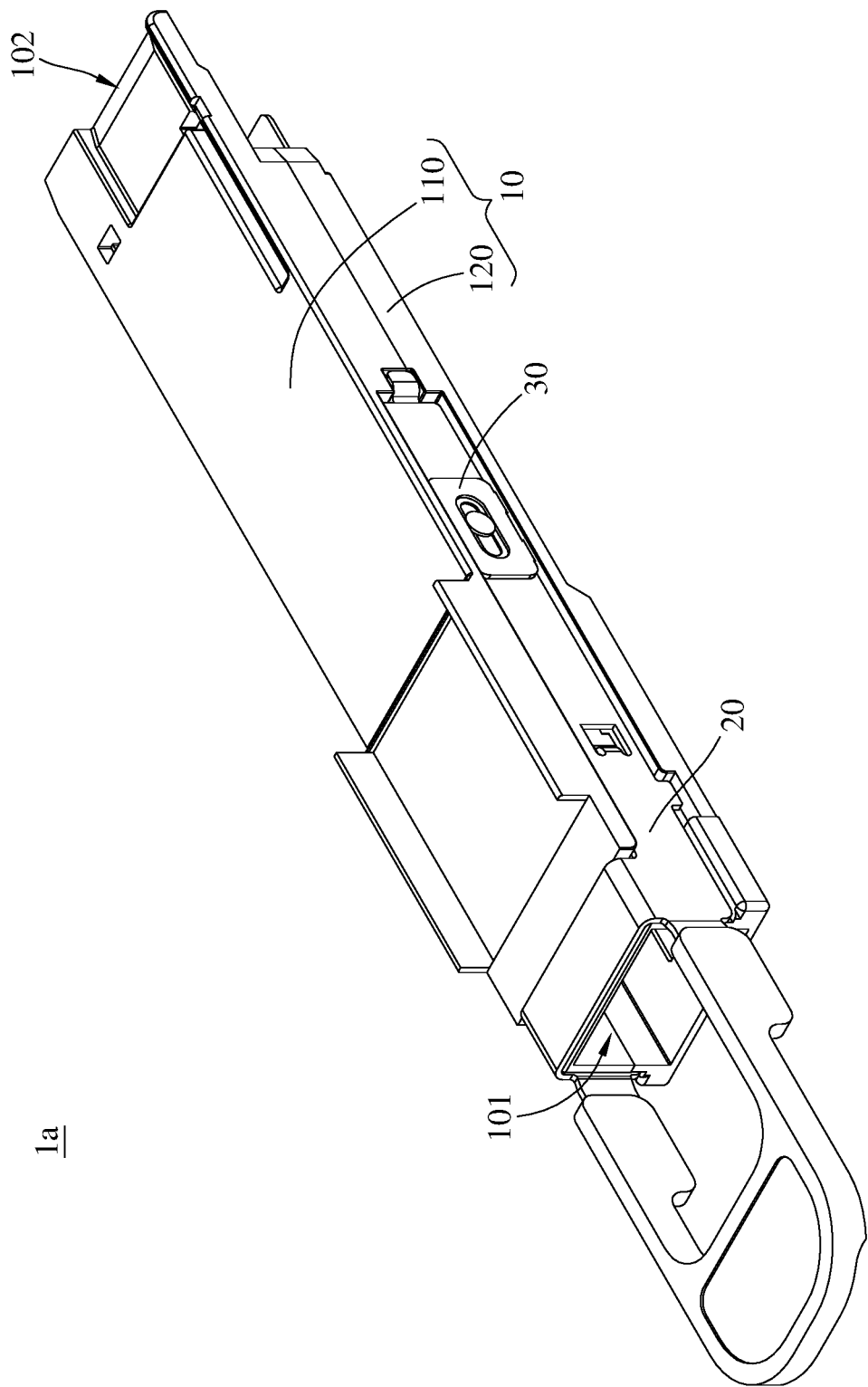
FIG. 1 is a perspective view of an optical transceiver according to one embodiment of the present disclosure.
Figure 2:
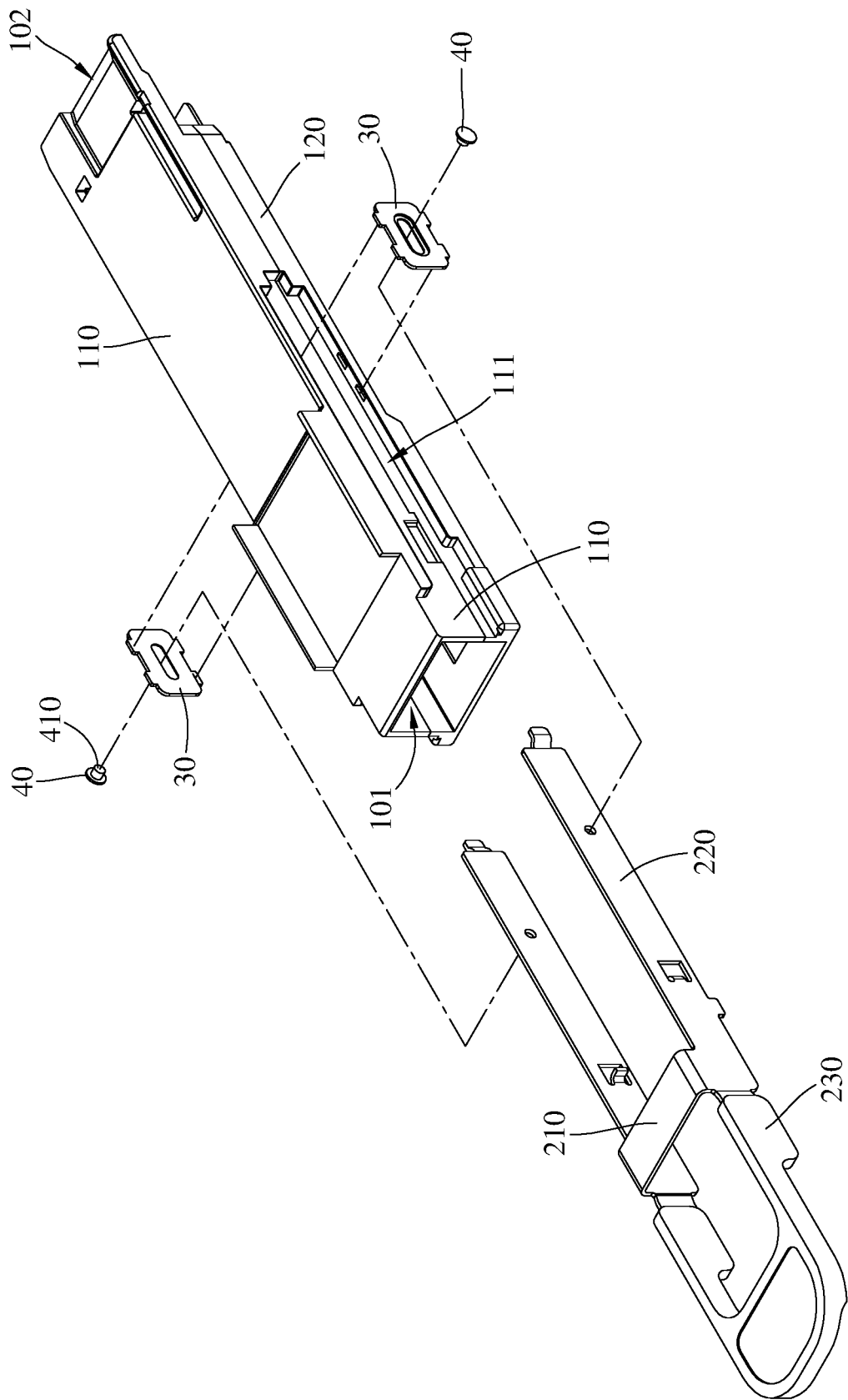
FIG. 2 is an exploded view of the optical transceiver in FIG. 1.

Please refer to FIG. 1 and FIG. 2. FIG. 1 is a perspective view of an optical transceiver according to one embodiment of the present disclosure. FIG. 2 is an exploded view of the optical transceiver in FIG. 1. In this embodiment, an optical transceiver 1a may include a housing 10, a fastening component 20 and a partition component 30. One or more optical communication elements, such as transmitter optical sub-assembly (TOSA) and/or receiver optical sub-assembly (ROSA), may be provided in the housing 10.

The housing 10 may include an upper casing 110 and a lower casing 120 which are assembled together. The housing 10 may be configured to be accommodated in a cage for optical communication, and details will be described hereafter. It is worth noting that the housing 10 including two parts (upper casing 110 and lower casing 120) are not limited in view of embodiments in the present disclosure. In some embodiments, the housing of the optical transceiver may be a single unit.

Referring to the housing 10 as a whole, the housing 10 may include a lateral surface 110, and a recessed groove 111 may be formed on the lateral surface 110. The recessed groove 111 may extend along a direction from an optical port 101 of the optical transceiver 1a toward an electrical port 102 of the optical transceiver 1a. The optical port 101 may include connectors or receptacles for transmitting optical signals, and the electrical port 102 may include wires or contact pads for transmitting electrical signals.

The fastening component 20 may include a linkage arm 210 and an extending arm 220 connected with each other. The linkage arm 210 may be disposed on a top surface 130 of the housing 10, and a bail 230 may be connected to the linkage arm 210. The extending arm 220 may be movably disposed in the recessed groove 111 formed on the lateral surface 110.

Figure 3:
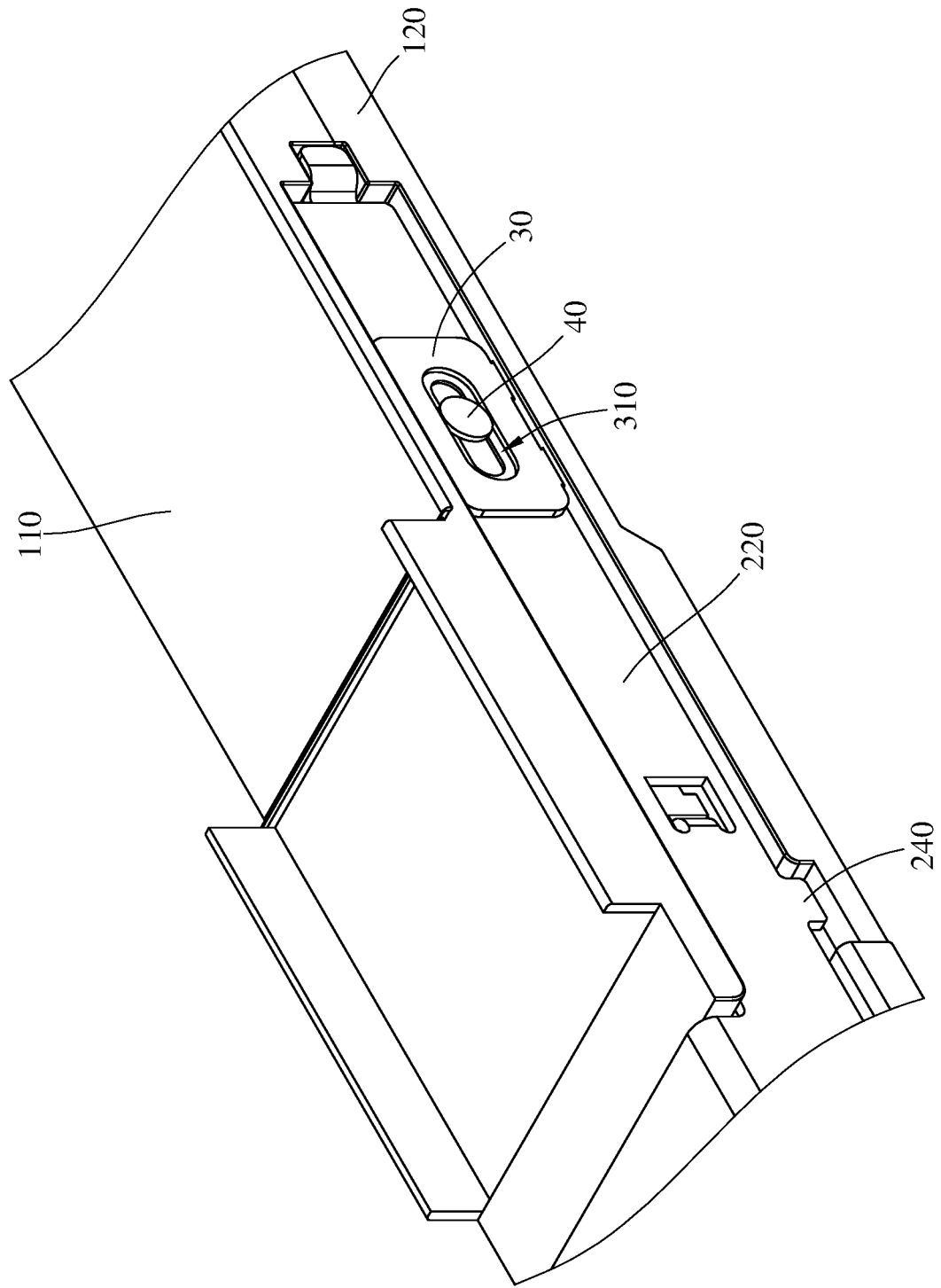
FIG. 3 is a partially enlarged view of the optical transceiver in FIG. 1.
Figure 4:
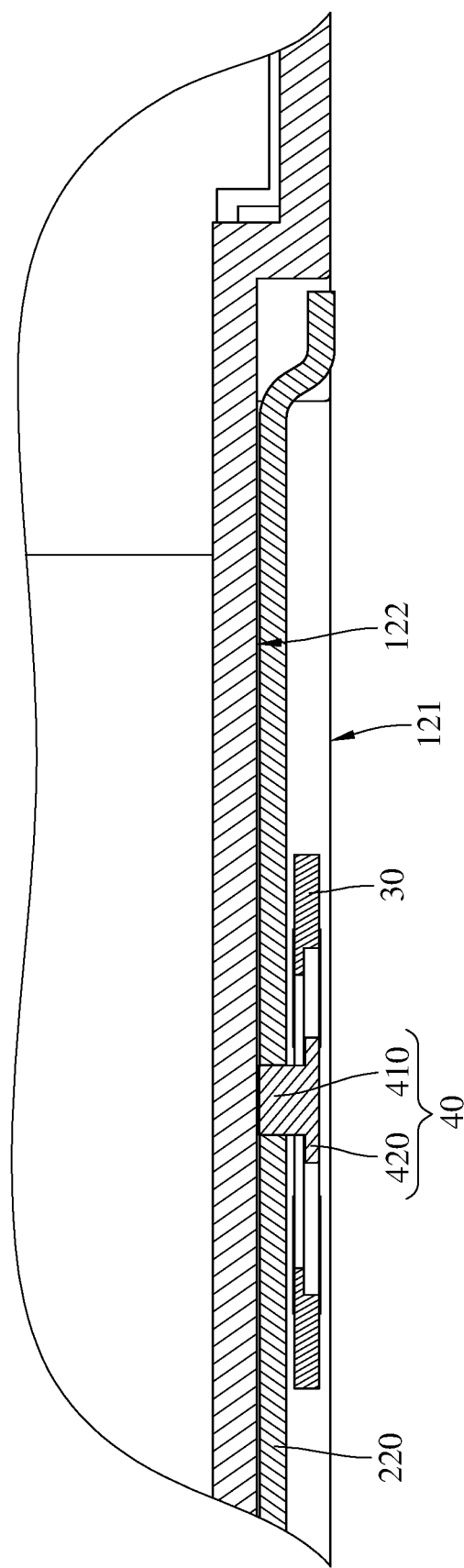
FIG. 4 is an exploded cross-sectional view of the optical transceiver in FIG. 1.
Figure 5:
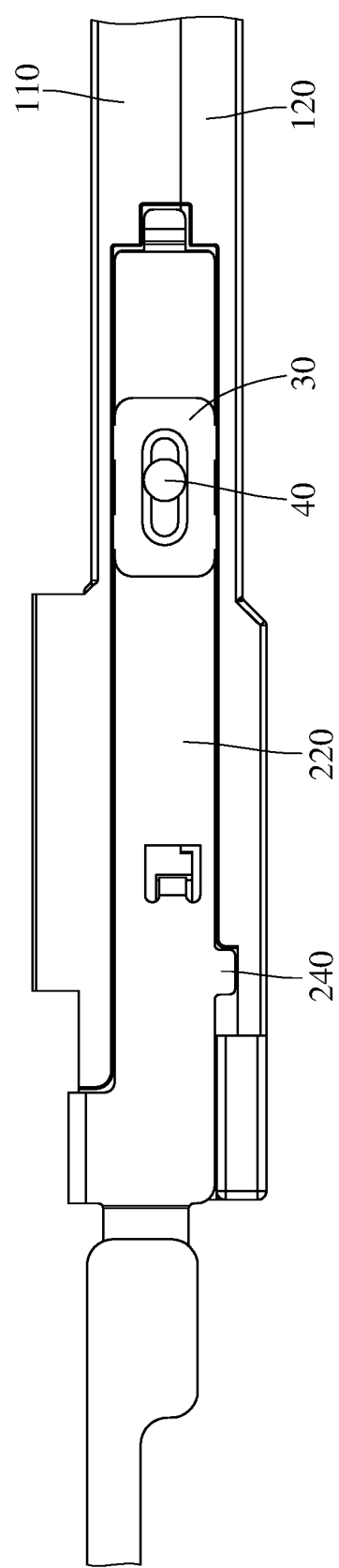
FIG. 5 is a side view of the optical transceiver in FIG. 1.

The partition component 30 is provided on the housing 10, and there may be two partition components 30 provided on respective and opposite lateral surfaces of the housing 10, as shown in FIG. 2. Please refer to FIG. 3 through FIG. 5. FIG. 3 is a partially enlarged view of the optical transceiver in FIG. 1. FIG. 4 is an exploded cross-sectional view of the optical transceiver in FIG. 1. FIG. 5 is a side view of the optical transceiver in FIG. 1. In this embodiment, the partition component 30 may be a metal sheet assembled with the housing 10 to be fixed to the housing 10. More specifically, opposite ends of the partition component 30 may be assembled with the upper casing 110 and the lower casing 120, respectively. The partition component 30 may be located at an open top 121 of the recessed groove 111 to be spatially apart from a groove bottom 122 of the recessed groove 111. At least part of the extending arm 220 of the fastening component 20 is located between the housing 10 and the partition component 30. It is worth noting that the partition component 30, which is an element separate from the housing 10 in this implementation, may be monolithically formed with the housing 10 in other implementations.

The fastening component 20 may be movably disposed on the partition component 30. Specifically, the optical transceiver 1a may further include a rivet 40 including a shaft 410 and a head 420 connected with each other. The shaft 410 may pass through the partition component 30 and is connected with the extending arm 220 of the fastening component 20. The head 420 and the extending arm 220 of the fastening component 20 may be located at opposite sides of the partition component 30, respectively. For example, as shown in FIG. 4 and FIG. 5, the head 420 of the rivet 40 might protrude from the partition component 30 when the extending arm 220 of the fastening component might stay beneath the partition component 30. The rivet 40 may be movable with respect to the partition component. Specifically, a rail 310 may be formed on a lateral surface of the partition component 30 and may be recessed toward the extending arm 220 of the fastening component 20. The head 420 of the rivet 40 may be slidably disposed in the rail 310. In some embodiments, the fastening component may be disposed on the partition component by other kinds of fastener.

Moreover, the fastening component 20 may further include a movement confining portion 240 configured to interact with the housing 10 to control a stroke of the fastening component 20. Any details will be described hereafter.

Figure 6:
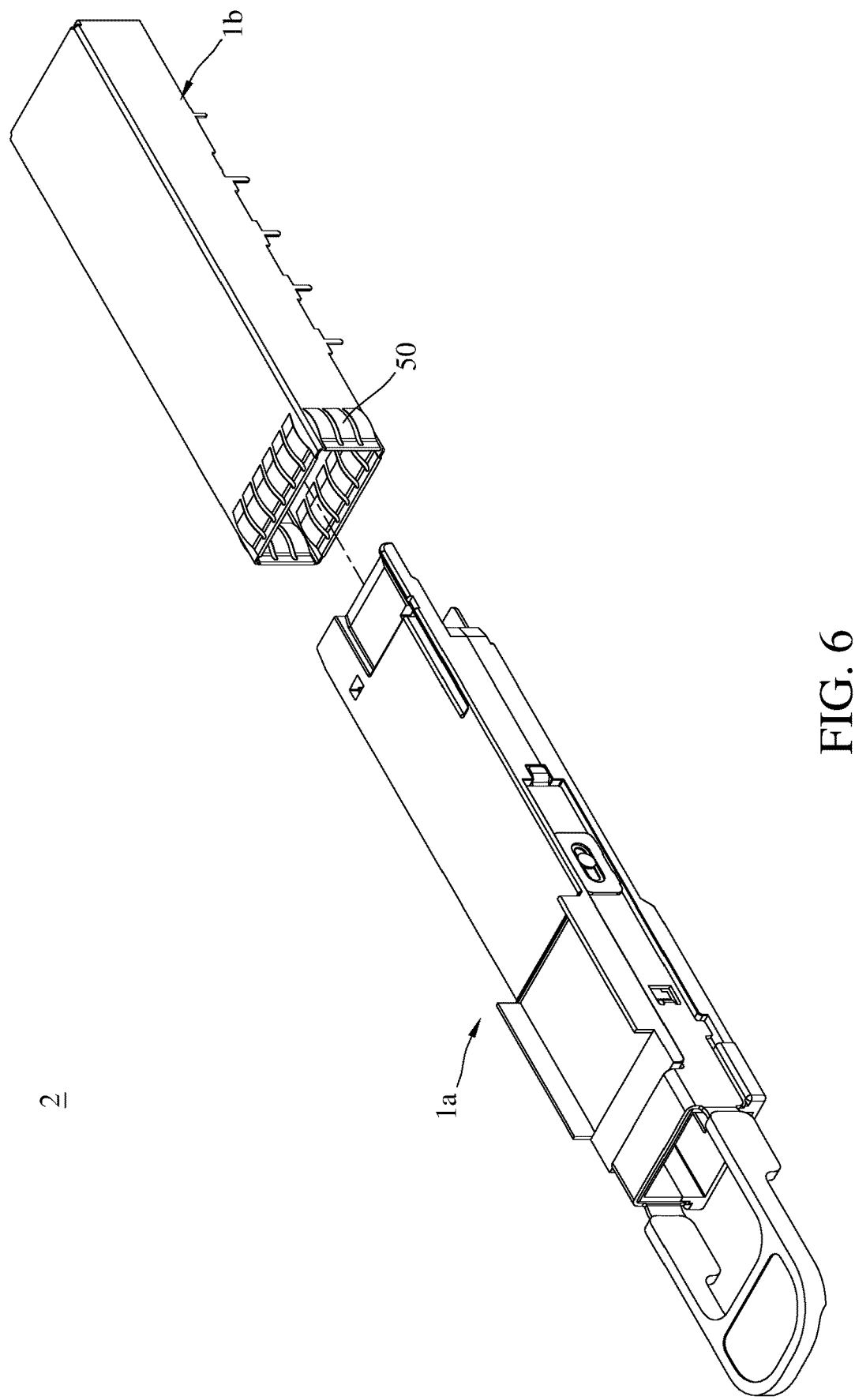
FIG. 6 is an exploded view of an optical system including the optical transceiver in FIG. 1, according to one embodiment of the present disclosure.
Figure 7:
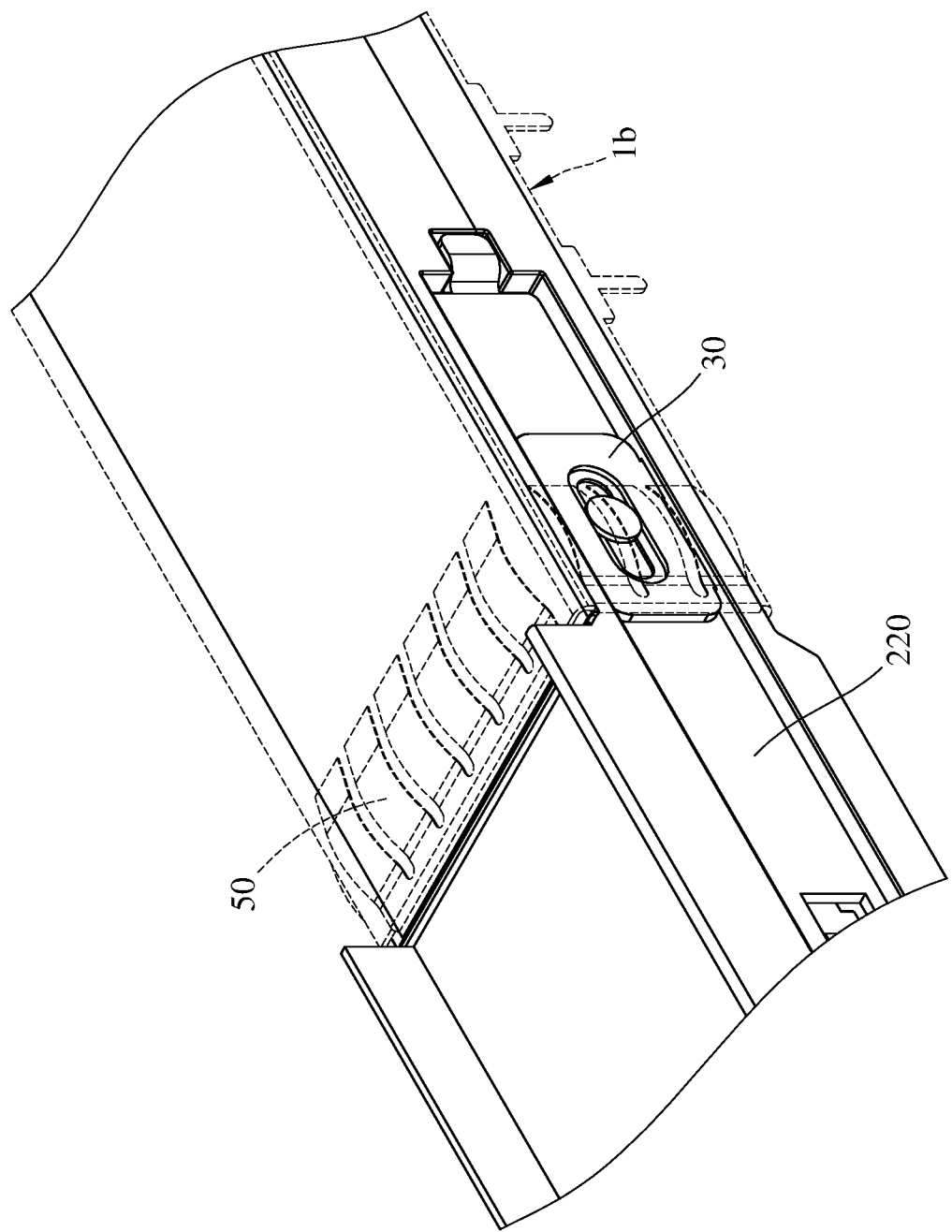
FIG. 7 is a schematic view of the optical system in FIG. 6, with the optical transceiver at a fastening state.
Figure 8:
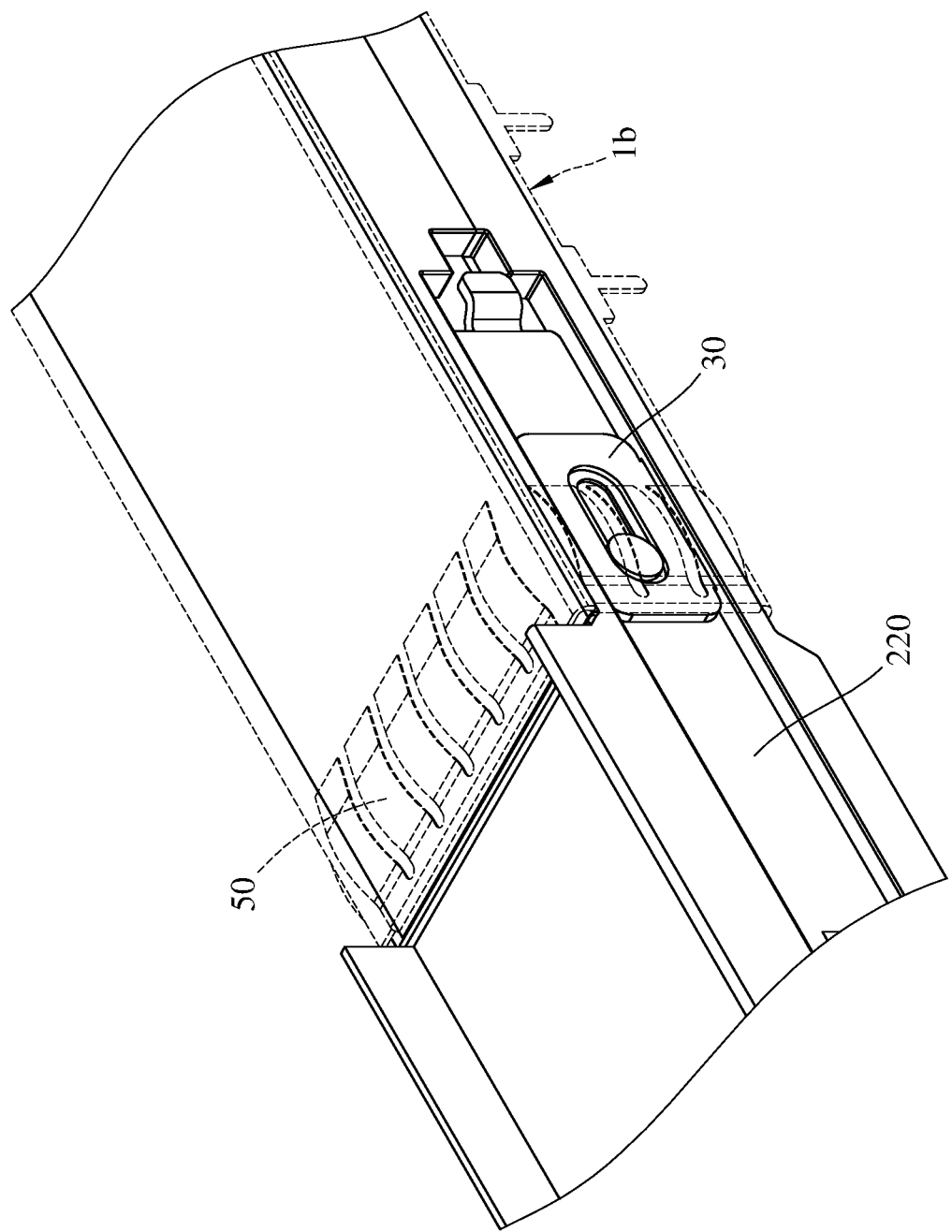
FIG. 8 is a schematic view of the optical system in FIG. 6, with the optical transceiver at a releasing state.

Please refer to FIG. 6 through FIG. 8. FIG. 6 is an exploded view of an optical system including the optical transceiver in FIG. 1, according to one embodiment of the present disclosure. FIG. 7 is a schematic view of the optical system in FIG. 6, with the optical transceiver at a fastening state. FIG. 8 is a schematic view of the optical system in FIG. 6, with the optical transceiver at a releasing state. In this embodiment, an optical system 2 may include a cage 1b and the aforementioned optical transceiver 1a. The optical transceiver 1a can be inserted into the cage 1b to be at a fastening state, as shown in FIG. 7, and drawn from the cage 1b by pulling the bail 230 to be at a releasing state, as shown in FIG. 8.

The cage 1b may include an electromagnetic shielding structure 50 provided for preventing electromagnetic interference (EMI) and/or improving electromagnetic compatibility (EMC). The electromagnetic shielding structure 50 may include spring fingers arranged around an opening of the cage 1b through which the optical transceiver 1a can be inserted into the cage 1b.

Referring to FIG. 7, the fastening component 20 of the optical transceiver 1a at the fastening state is fastened with the cage 1b. In detail, the extending arm 220 of the fastening component 20 may be hooked to a slot formed on the cage 1b, and the partition component 30 may physically touch the electromagnetic shielding structure 50. The partition component 30 may be located between the extending arm 220 of the fastening component 20 and the electromagnetic shielding structure 50 of the cage 1b so as to separate at least part of the fastening component 20 (that is, the extending arm 220) from the cage 1b.

Referring to FIG. 8, the fastening component 20 at the releasing state is detached from the cage 1b. In detail, the fastening component 20 can be drawn to be unhooked from the slot formed on the cage 1b, such that the optical transceiver 1a can be removed from the cage 1b. Also, when the fastening component 20 is drawn, a part of the fastening component 20 pushes one or more elastic elements (not shown in the drawings). The elastic elements compressed by the fastening component 20 may release to move the fastening component 20 back to its normal position at the fastening state.

As to a conventional optical transceiver inserted into corresponding cage, when the fastening component is accidentally moved to cause the optical transceiver to be detached from the cage, it is expected that the fastening component can be moved back by the elastic element so as to re-hook with the cage. However, an interference fit due to manufacturing variations or specific structure for electromagnetic shielding may be present between the cage and the fastening component, resulting in the friction that could undermine the re-hooking between the fastening component and the cage, when the force provided by the elastic element is insufficient to move the fastening component.

According to the present disclosure, the optical transceiver includes a partition component which separates the fastening component from the cage. Therefore, the fastening component can be prevented from touching an edge of the cage opening or some structures formed on the cage such as electromagnetic shielding structure. When the fastening component is accidentally pulled, since the partition component is provided between the fastening component and the cage, the movement of the fastening component will not be obstructed by any friction force generated due to interference fit. Thus, the fastening component can be successfully moved back to its normal position by the elastic element and then re-fasten with the cage.

Moreover, in some cases, the fastening component is movably disposed on the partition component by a rivet connected with the fastening component. The rivet helps maintain the fastening component be apart from the partition component, thereby reducing friction force which may obstruct the movement of the fastening component.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical system, comprising:
   a cage; and
   an optical transceiver inserted into the cage in a pluggable manner and comprising:
      a housing;
      a partition component provided on the housing; and
      a fastening component movably disposed on the housing between a fastening state and a releasing state, wherein the fastening component is fastened with the cage in the fastening state and detached from the cage in the releasing state, and wherein the fastening component is hooked with the cage in the fastening state, and
      the partition component is located between the fastening component and the cage to separate a part of the fastening component from the cage when the fastening component moves between the releasing state and the fastening state.

2. The optical system according to claim 1, wherein the housing of the optical transceiver comprises a lateral surface where a recessed groove is formed, the fastening component is movably disposed in the recessed groove, and the partition component is located at an open top of the recessed groove to be spatially apart from a groove bottom of the recessed groove.

3. The optical system according to claim 1, wherein the housing comprises an upper casing and a lower casing assembled together, and opposite ends of the partition component are assembled with the upper casing and the lower casing, respectively.

4. The optical system according to claim 1, wherein the cage comprises an electromagnetic shielding structure, and the partition component is located between the fastening component and the electromagnetic shielding structure.

5. The optical system according to claim 4, wherein the partition component physically touches the electromagnetic shielding structure.

6. The optical system according to claim 4, wherein the partition component is made of metal.

7. The optical system according to claim 1, wherein the partition component is fixed to the housing, and the fastening component is movably disposed on the partition component.

8. The optical system according to claim 7, wherein the optical transceiver further comprises a rivet, a shaft of the rivet passes through the partition component and is connected with the fastening component, a head of the rivet and the fastening component are respectively located at opposite sides of the partition component, and the rivet is movable with respect to the partition component.

9. The optical system according to claim 8, wherein a rail is formed on the partition component and recessed toward the fastening component, and the head of the rivet is slidably disposed in the rail.

10. The optical system according to claim 1, wherein the fastening component comprises a movement confining portion configured to interact with the housing to control a stroke of the fastening component.

11. An optical transceiver, comprising:
a housing comprising an upper casing and a lower casing assembled together;
a partition component, wherein opposite ends of the partition component are assembled with the upper casing and the lower casing, respectively; and
a fastening component movably disposed on the housing, wherein a part of the fastening component is located between the housing and the partition component, wherein the fastening component and the partition component are located outside of the housing.

12. The optical transceiver according to claim 11, wherein the housing comprises a lateral surface where a recessed groove is formed, the fastening component is movably disposed in the recessed groove, and the partition component is located at an open top of the recessed groove to be spatially apart from a groove bottom of the recessed groove.

13. The optical transceiver according to claim 11, wherein the partition component is made of metal.

14. The optical transceiver according to claim 11, wherein the partition component is fixed to the housing, and the fastening component is movably disposed on the partition component.

15. An optical transceiver, comprising:
a housing;
a partition component provided on the housing;
a fastening component movably disposed on the housing, wherein a part of the fastening component is located between the housing and the partition component, wherein the fastening component and the partition component are located outside of the housing; and
a rivet comprising a shaft passing through the partition component and a head on an end of the shaft, wherein the shaft is connected with the fastening component, the head and the fastening component are respectively located at opposite sides of the partition component, and the rivet is movable with respect to the partition component.

16. The optical transceiver according to claim 15, wherein the partition component is fixed to the housing, and the partition component is made of metal.

17. The optical transceiver according to claim 15, wherein a rail is formed on the partition component and recessed toward the fastening component, and the head of the rivet is slidably disposed in the rail.

18. The optical transceiver according to claim 11, wherein the part of the fastening component is located between the housing and the partition component in a transverse direction of the optical transceiver.

19. The optical transceiver according to claim 15, wherein the part of the fastening component is located between the housing and the partition component in a transverse direction of the optical transceiver.

20. The optical system according to claim 1, wherein the fastening component and the partition component are located outside of the housing.

* * * * *